(No Model.)  12 Sheets—Sheet 1.

F. PRAUNEGGER.
TYPE SETTING MACHINE.

No. 524,692.  Patented Aug. 14, 1894.

Witnesses.
B. W. Miller
C. W. Brooks

Inventor,
Ferdinand Praunegger,
By his Attorneys,
Baldwin Davidson
& Wight.

(No Model.)

F. PRAUNEGGER.
TYPE SETTING MACHINE.

No. 524,692.   Patented Aug. 14, 1894.

Witnesses.
B. W. Miller.
C. W. Brooke.

Inventor:
Ferdinand Praunegger.
By his Attorneys
Baldwin Davidson Wight (No Model.)  12 Sheets—Sheet 3.

F. PRAUNEGGER.
TYPE SETTING MACHINE.

No. 524,692.  Patented Aug. 14, 1894.

Fig. 4.

Witnesses
B. W. Miller
Guy E. Davis

Inventor
Ferdinand Praunegger
By his Attorneys,
Baldwin Davidson & Wight (No Model.)　　　F. PRAUNEGGER.　　12 Sheets—Sheet 4.
TYPE SETTING MACHINE.

No. 524,692.　　　　　　　Patented Aug. 14, 1894.

Fig. 5.

Witnesses
B. W. Miller.
C. W. Brooke.

Inventor
Ferdinand Praunegger,
By his Attorneys
Baldwin Davidson Wight.

(No Model.)

F. PRAUNEGGER.
TYPE SETTING MACHINE.

No. 524,692.   Patented Aug. 14, 1894.

Fig. 6.

Witnesses
B. W. Miller
C. W. Brooke

Inventor
Ferdinand Praunegger
By his Attorneys
Baldwin Davidson & Wight (No Model.)  12 Sheets—Sheet 6.

F. PRAUNEGGER.
TYPE SETTING MACHINE.

No. 524,692.  Patented Aug. 14, 1894.

Witnesses
B. W. Miller
C. M. Brooke

Inventor
Ferdinand Praunegger
By his Attorneys
Baldwin, Davidson & Wight (No Model.) 12 Sheets—Sheet 7.

F. PRAUNEGGER.
TYPE SETTING MACHINE.

No. 524,692. Patented Aug. 14, 1894.

Witnesses.
B. W. Miller
C. M. Brooke

Inventor.
Ferdinand Praunegger,
By his Attorneys,
Baldwin Davidson & Wight.

(No Model.) F. PRAUNEGGER. 12 Sheets—Sheet 8.
TYPE SETTING MACHINE.

No. 524,692. Patented Aug. 14, 1894.

Witnesses
B. W. Miller
C. W. Brooke.

Inventor
Ferdinand Praunegger
By his Attorneys (No Model.)　　　　　　　F. PRAUNEGGER.　　　　12 Sheets—Sheet 11.
TYPE SETTING MACHINE.

No. 524,692.　　　　　　　　　　　Patented Aug. 14, 1894.

Witnesses

Inventor
Ferdinand Praunegger,
By his Attorneys, (No Model.)

F. PRAUNEGGER.
TYPE SETTING MACHINE.

No. 524,692. Patented Aug. 14, 1894.

*Fig. 27.*

Witnesses
B. W. Miller
C. W. Brooke

Inventor
Ferdinand Praunegger,
By his Attorneys,
Baldwin Davidson & Wight

UNITED STATES PATENT OFFICE.

FERDINAND PRAUNEGGER, OF GRAZ, AUSTRIA-HUNGARY, ASSIGNOR OF ONE-HALF TO HEINRICH LOUIS BENNO TOOBE, OF HULL, ENGLAND.

TYPE-SETTING MACHINE.

SPECIFICATION forming part of Letters Patent No. 524,692, dated August 14, 1894.

Application filed March 12, 1894. Serial No. 503,389. (No model.) Patented in England January 6, 1893, No. 299.

*To all whom it may concern:*

Be it known that I, FERDINAND PRAUNEGGER, a subject of the Emperor of Austria-Hungary, residing at No. 4 Stempfergasse, Graz, in the Empire of Austria-Hungary, have invented certain new and useful Improvements in Type-Setting Machines, (for which I have received Letters Patent in Great Britain, No. 299, dated January 6, 1893,) of which the following is a specification.

The improvements relate to a type setting machine such as is described in the specification of my German patent, No. 45,517, in which the type reservoirs are set side by side with their extremities (from which the type are to be delivered one by one) ranged in the arc of a circle and in which a carrier at the end of an arm which can turn around a vertical axis concentric with the arc can be moved to the right or left to bring it below the end of any reservoir for a type to be delivered into the carrier from that reservoir and be afterward moved back into a position below the center of the arc and then caused to drop the type into a channel in which the type are to be set up in line.

According to this invention the arm or transport bar is mounted loosely upon the central vertical axis and tapes or cords attached to the arm near its end are employed to draw it to the one side or the other as required. This allows of the bar or arm being made very light, its movement can therefore readily be arrested at any desired point as its momentum will be but small. In order also that in the type setting machine a single type may with greater certainty be ejected from any type reservoir opposite to which the transport bar or arm is brought to rest the reservoirs are set nearly in a vertical position and so that the type lying in the reservoirs are parallel with radial lines of the arc and so that the lowest type can be pushed out from any reservoir by a radial pusher carried by the arm.

Figures 1 to 27 show a complete type setting machine in which the invention is embodied.

A (see Fig. 1) is a crank axle driven continuously by a treadle $A^\times$—from it motion is conveyed by an endless chain $a'$ working over chain wheels $a$ $a$ to another shaft A' at the upper part of the machine. From this shaft motion is conveyed to the other parts of the machine as hereinafter explained.

K are the type reservoirs ranged radially in the arc of a circle. Each reservoir is a trough shaped holder set in a nearly upright position but sloping slightly backward the bottom of the trough being at the back as shown. The bottom end of each trough reservoir is closed and an opening $k'$ is made through the back through which a pusher $k^5$ can be thrust forward to thrust outward the lowermost type in the reservoir through another small opening at the front; a guard $K^\times$ prevents more than one type being thrust out at each forward movement of the pusher.

The type reservoirs K are not fixed but their lower ends are slid into corresponding sockets K' through the back of which are openings corresponding to the openings $k'$ for the pushers $k^5$ to work through. The type reservoirs can therefore quickly be moved from the distributing to the type setting machine and vice versa.

The pushers $k^5$ can be slid to and fro as hereinafter explained along rods $k^7$ which extend back from the rear of the sockets K'.

D' is the transport bar capable of being turned freely around the vertical axis B and carrying at its end a carrier or receptacle D. $d^5$ is a tape passed around pulleys $d^6$ on vertical axes $d^{6\times}$ and having its ends attached to opposite sides of the end of the transport bar. On the axes $d^{6\times}$ are other pulleys $d^{6\times\times}$ around which passes a tape $d^{5\times}$. The ends of this tape are passed in opposite directions around and are secured to a double wheel or drum $D^3$. The drum $D^3$ can be revolved in either direction by a pinion $D^2$ upon it gearing into a toothed arc $D^\times$ which is fast on the vertical shaft B, so that when this shaft is turned the transport bar is turned in the same direction. $d^7$ are rollers pressed against the band $d^{5\times}$ by springs $d^8$ to prevent its becoming slack.

Figure 6:
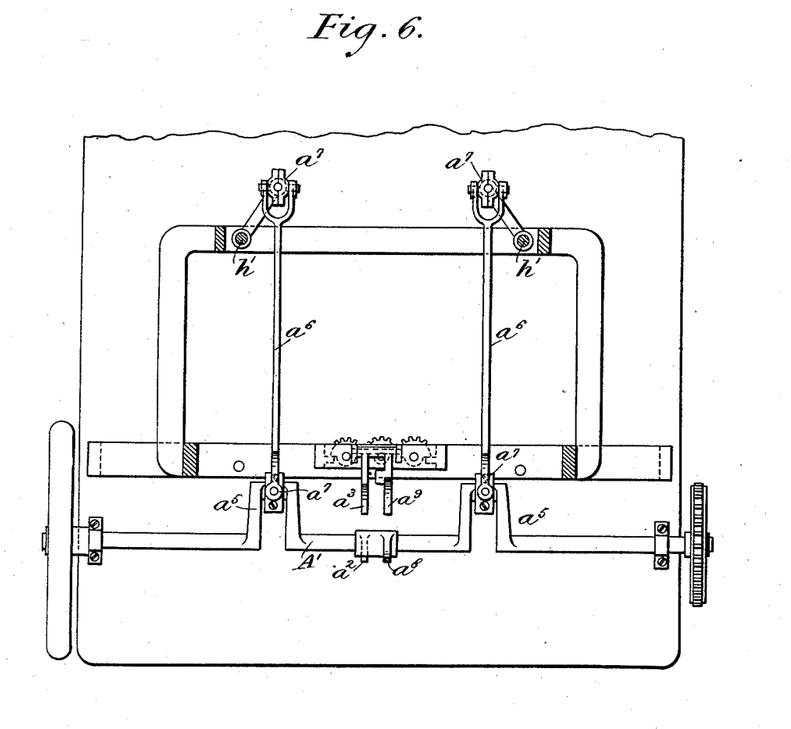
Fig. 6 a plan view of driving mechanism.
Figure 7:
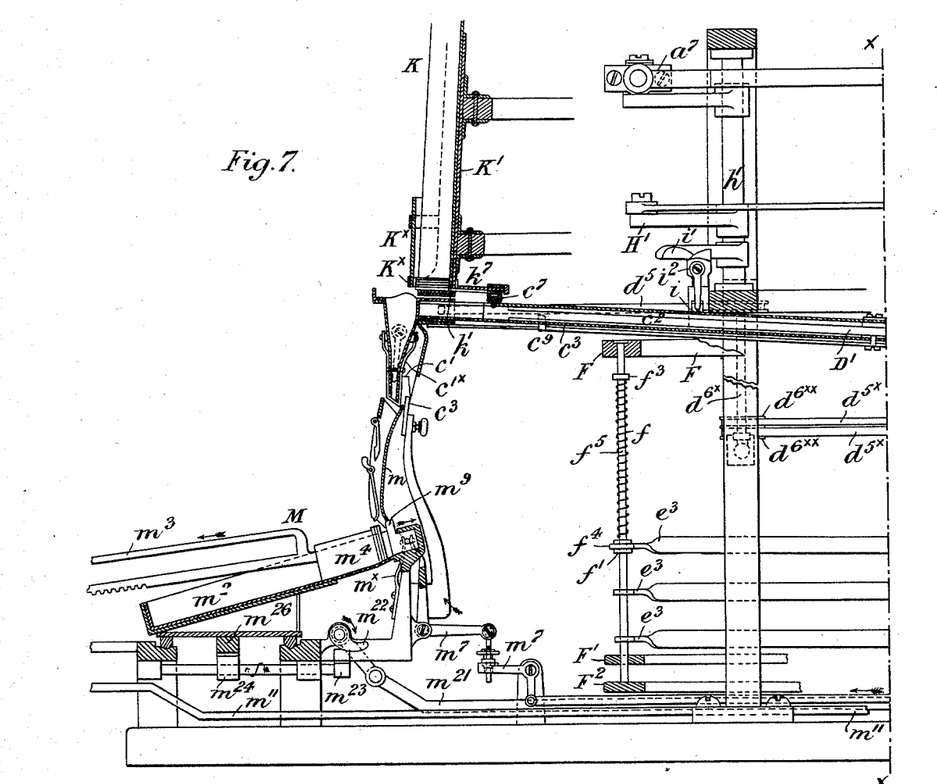
Figs. 7 and $7^\times$ show vertical sections of parts of the machine on a larger scale than shown in Fig. 1, the machine being divided on the line $x—x$ to show the parts on a sufficiently large scale.

The axis B is turned in one direction or the other as required in the following manner:—Fast with the axis B are two toothed quadrants $d$ into which other quadrants H which have a to and fro rotating movement can be made to gear. To give this to and fro movement to the quadrants H their axes $h$ have upon them arms $h^4$ which are coupled by rods $h^2$ to corresponding arms H' on vertical axis $h'$ to which a to and fro revolving movement is imparted, by crank arms upon them being connected by rods $a^6$ (see Fig. 6) and universal joints $a^7$ to cranks $a^5$ on the continuously revolving shaft A' as seen in Figs. 1, 6 and 7.

Figure 1:
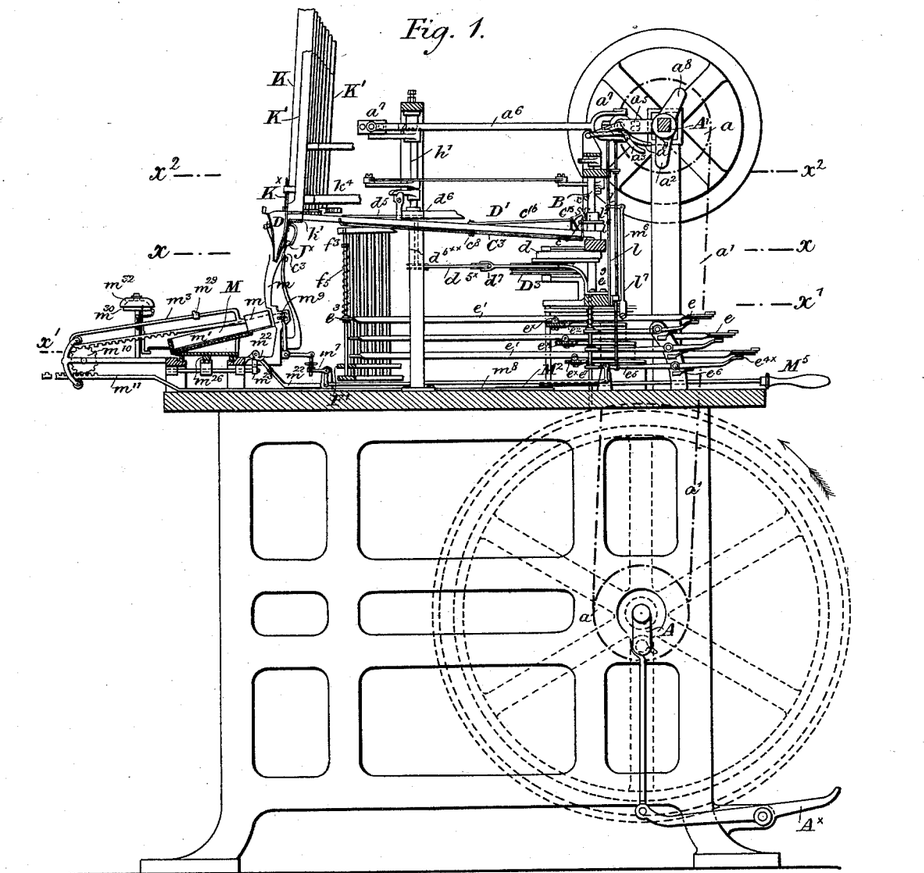
Fig. 1 is a vertical section.
Figure 2:
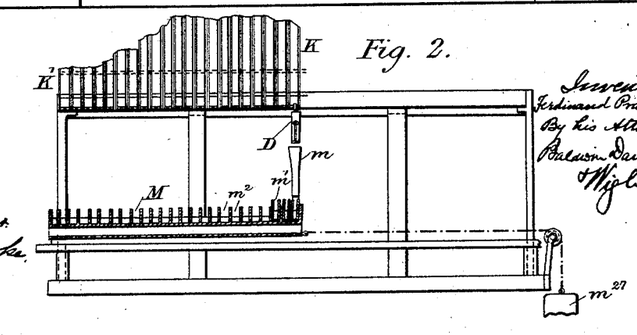
Fig. 2 a front view of some of the type reservoirs K and of the channels $m'$ in which the type are to be set up in line.
Figures 20, 20X:
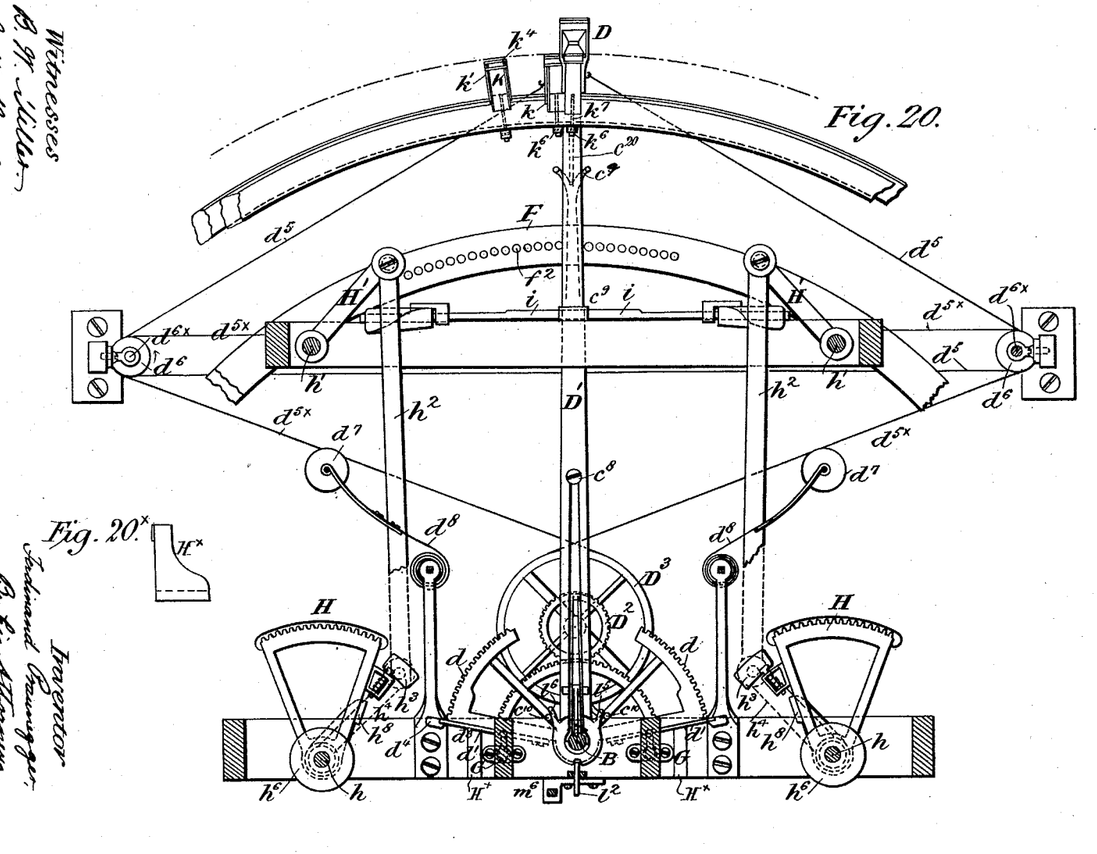
Fig. 20 a plan view on a larger scale of type conveying mechanism shown in Fig. 5; Fig. $20^\times$ is an elevation of one of the stops $H^\times$.
Figure 21:
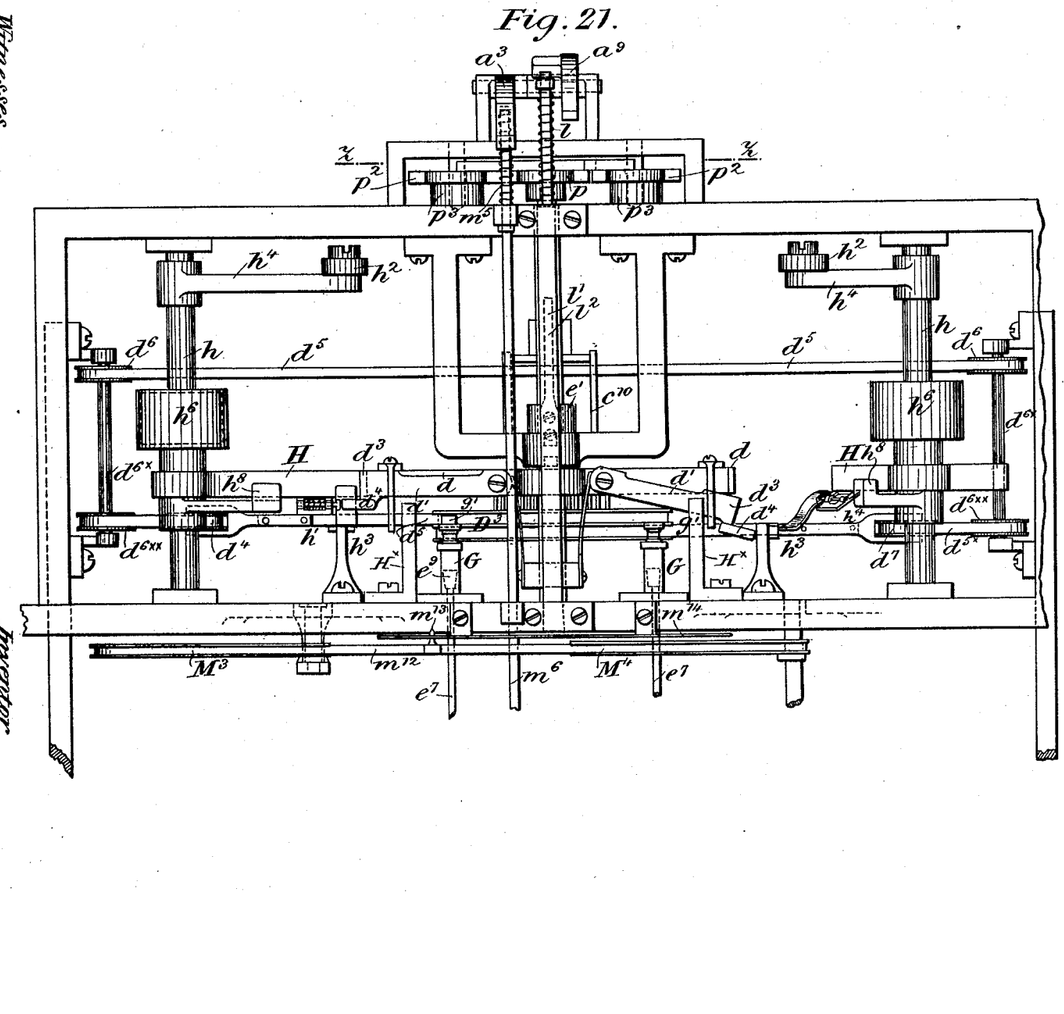
Fig. 21 a back view of mechanism shown in Fig. 20.

Normally when the transport bar D' is in its central position the quadrants H swing to and fro without engaging with the quadrants $d$ and the transport bar remains at rest but if a finger key is depressed one or other of them is made to engage with one or other quandrant H and the transport bar is thereby caused to be drawn to one side or the other as required. This is done in the following manner:

Hinged to the quadrants $d$ are arms $d'$ (see Figs. 20 and 21)—normally these hang downward in the position shown on the right hand side of Fig. 21—but on the depression of a finger key one or other of them is raised into the position shown on the left hand side of Fig. 1—when raised into this position it gets struck by the end of the quadrant H and is thereby turned a short distance until the two quadrants H, $d$ gear together, the transport bar D' is thereby caused to be drawn to one side or the other according to which quadrant H has been brought into gear.

$H^\times$ are stops to insure that the two toothed quadrants $d$ on the axis B shall after each of its movements return exactly to its central position so that unless one or other of the arms $d'$ be raised the quadrants H may at their next movement swing clear without gearing with either of the quadrants $d$.

The finger keys are marked $e$, they are arranged in three rows one above the other half of them to the left of the axis B of the transport bar and half to the right. The key-levers $e'$ turn on axis $e^\times$ and are normally held by springs $e^2$ in the position shown in Figs. 1 and 7. The end $e^3$ of each key lever is forked and rests on a collar $f'$ fast on a vertical stop rod $f$. These vertical rods $f$ are ranged in the arc of a circle concentric with the axis B around which the transport bar turns and can be raised or lowered through guide holes in fixed bars F F'—F$^2$ is a fixed support for the lower ends of the rods $f$ to rest on.

$f^3$ is a collar fixed to the rod and $f^5$ a coiled spring interposed between this collar and a loose collar $f^4$ which is above the end of the key lever. The collar $f^3$ serves as a stop to prevent the collar being lifted too high—the spring yields if the finger key is depressed more than is necessary to lift the stop rod to the height required.

Figure 4:
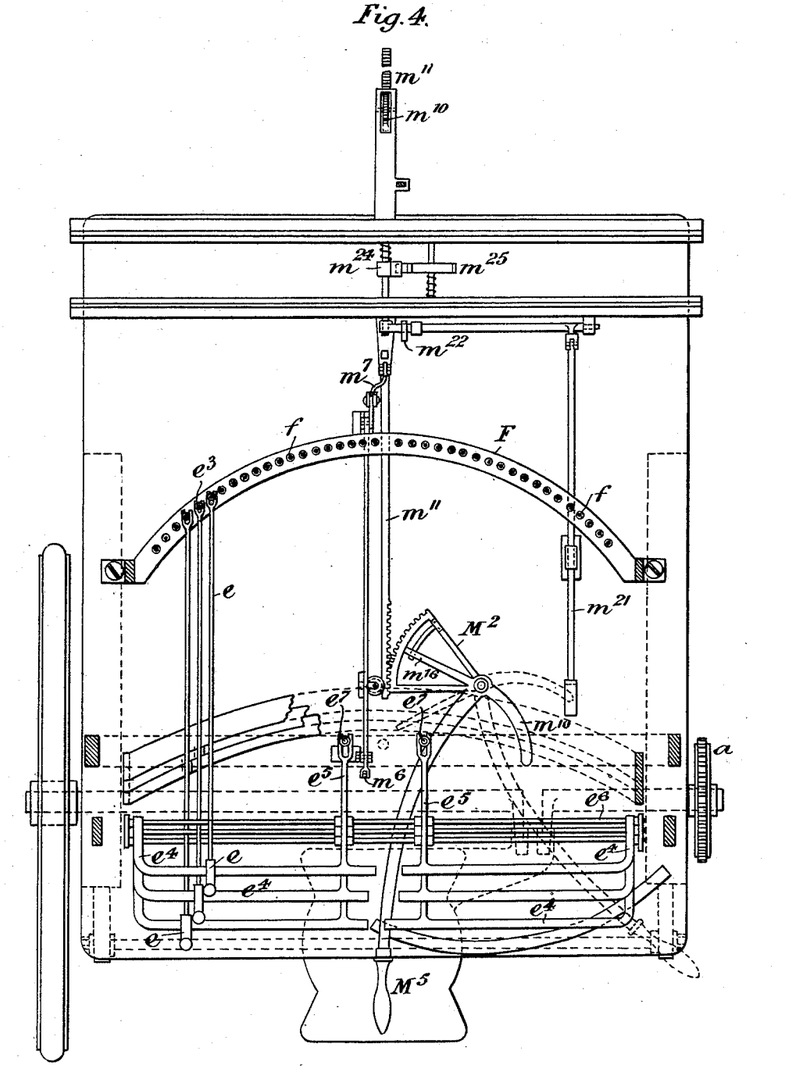
Fig. 4 a horizontal section on the line $x'$, $x'$, Fig. 1.
Figure 5:
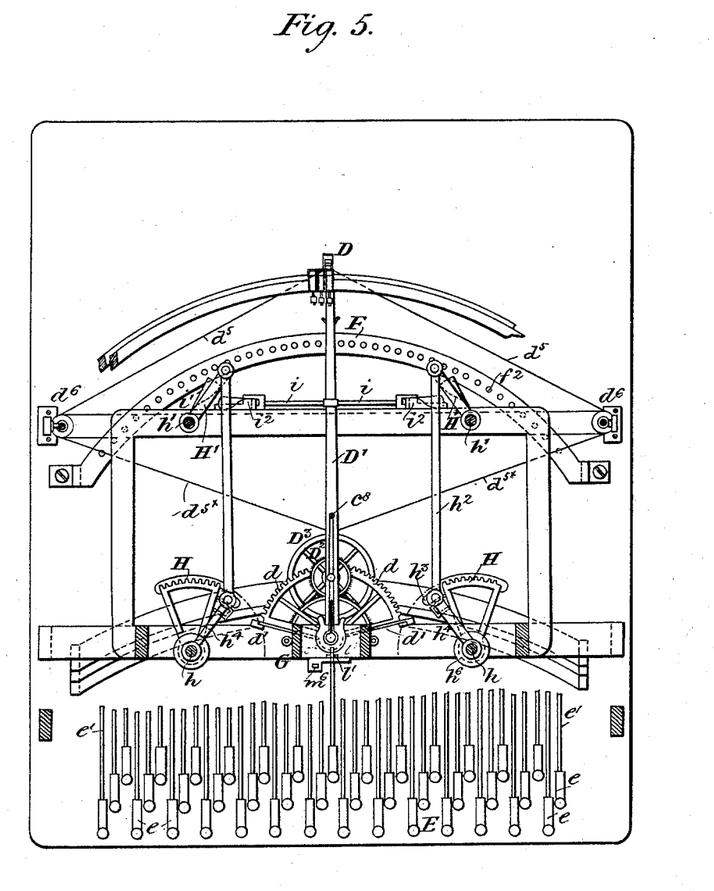
Fig. 5 a horizontal section on the line $x^2$, $x^2$, Fig. 1.

Under each row of finger keys on the left hand half of the machine is a bar $e^{4\times}$ carried by lever arms $e^4$ which turn on axes $e^6$—other arms $e^5$ of the same levers are forked and embrace a vertical rod $e^7$ (see Figs. 1, 4 and 7).

A similar arrangement of parts is applied on the right hand half of the machine. Each vertical rod $e^7$ has upon it three collars $e^{7\times}$ which come above the forked ends of the three lever arms $e^5$—a coiled spring $e^{\times\times}$ bears against the uppermost collar and keeps the three collars resting on the top of the three forks. In this way whenever any finger key say on the left hand side of the machine is depressed the vertical rod $e^7$ on this side of the machine will be raised a distance.

Just above the upper end of each vertical rod $e^7$ is the lower end of a small tongue $g$ (see Figs. 7 and 25) which is jointed to the under side of an arm $g^\times$ which has a rod $g^2$ descending from it which can slide up and down in a fixed cylinder G. Surrounding the rod $g^2$ within this cylinder is a coiled spring $g^{2\times}$ which presses the rod down into its lowest position. The small tongue $g$ passes down through a slot in an arm $G^\times$ which extends from the top of the cylinder G and is pressed by a spring $g^3$ into the position shown in Fig. 25 so that its lower end comes above the head $e^9$ of the rod $e^7$. Standing up from the arm $g^\times$ is a projection $g'$ which comes below the arm $d'$ which as before stated is hinged at the end of the toothed quadrants $d$. In this way it will be seen that whenever a finger key say on the left hand side of the machine is depressed the arm $d'$ carried by the toothed quadrant $d$ which is on this side of the machine will be raised also so that its end $d^3$ is brought into the path of the swinging quadrant H and when this quadrant swings toward the end $d^3$ this end gets struck by the end of the quadrant and the quadrants $d$ and H on the left hand side of the machine are brought into gear and the transport bar D' is so caused to swing to the left also.

It is immaterial how far the rods $e^7$ are raised by the depression of the finger keys. If they are raised too high the tongues $g$ as they are lifted are drawn off from the heads of the rods by the action of the end of the slot in the arm $G^\times$ and the rod $e^7$ may continue to rise while the tongue and part $g'$ in connection with it descend to their normal position.

If the rod $e^7$ be not raised sufficiently to bring the arm $d'$ into a horizontal position it is caused to be raised by an incline $h^3$ carried by each toothed quadrant H which when these segments swing inward toward one another catches under a projection $d^4$ (see Figs. 20 and 21) on the end of the arm $d'$ if the arm has been slightly raised and then completes the lifting of the arm into a horizontal position but if the arm $d'$ has not been raised at all the incline passes clear of the projection $d^4$ without raising it. The incline is hinged to the segment H so that on the backward movement of this segment it may pass the projection $d^4$.

In order that the finger keys may always be depressed at the proper times relatively to the movements of the other parts of the machine it is arranged that the finger keys shall be depressed at the times when the treadle is near to the lowest point of its movement.

By the depression of a finger key on the left hand side of the machine a stop pin $f$ will have been raised on this side of the machine as above explained and the transport bar D' will continue its movement until it comes against and is arrested by this stop. To permit of the movement of the bar being arrested the toothed quadrants H are not fast upon their shafts $h$ but are turned by springs contained in spring boxes $h^6$ in a direction to make them bear against the ends of arms $h^8$ which are fast on the shafts $h$. When the movement of the transport bar D' is arrested the movement of the quadrant H is also necessarily arrested but the arm $h^8$ continues to turn and the spring in the spring box $h^6$ becomes somewhat more wound up. On the backward movement of the axis $h$ the arm $h^8$ again comes against the quadrant H and turns the quadrant back again.

Figures 22, 23, 24, 25, 26:
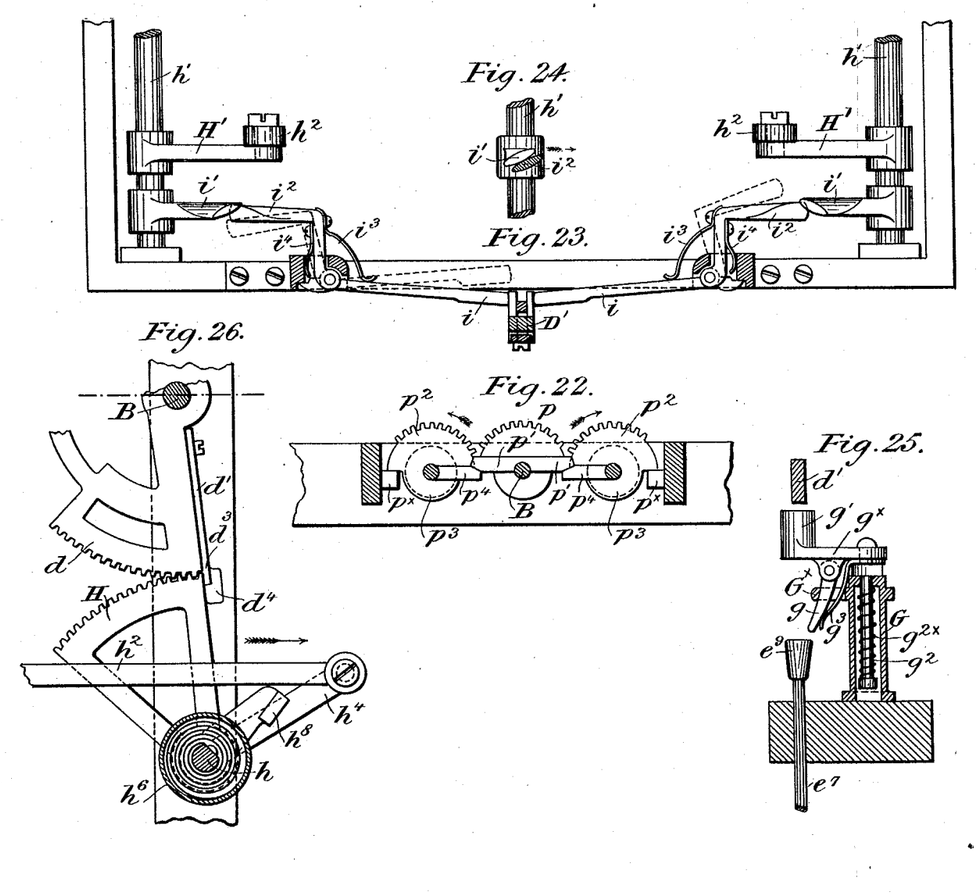
Fig. 22 a section on the line Z Z Fig. 21.
Fig. 23 a front view of parts for holding the transport bar D' in its central position.
Figs. 24, 25 and 26 show details of some of the parts.
Figure 27:
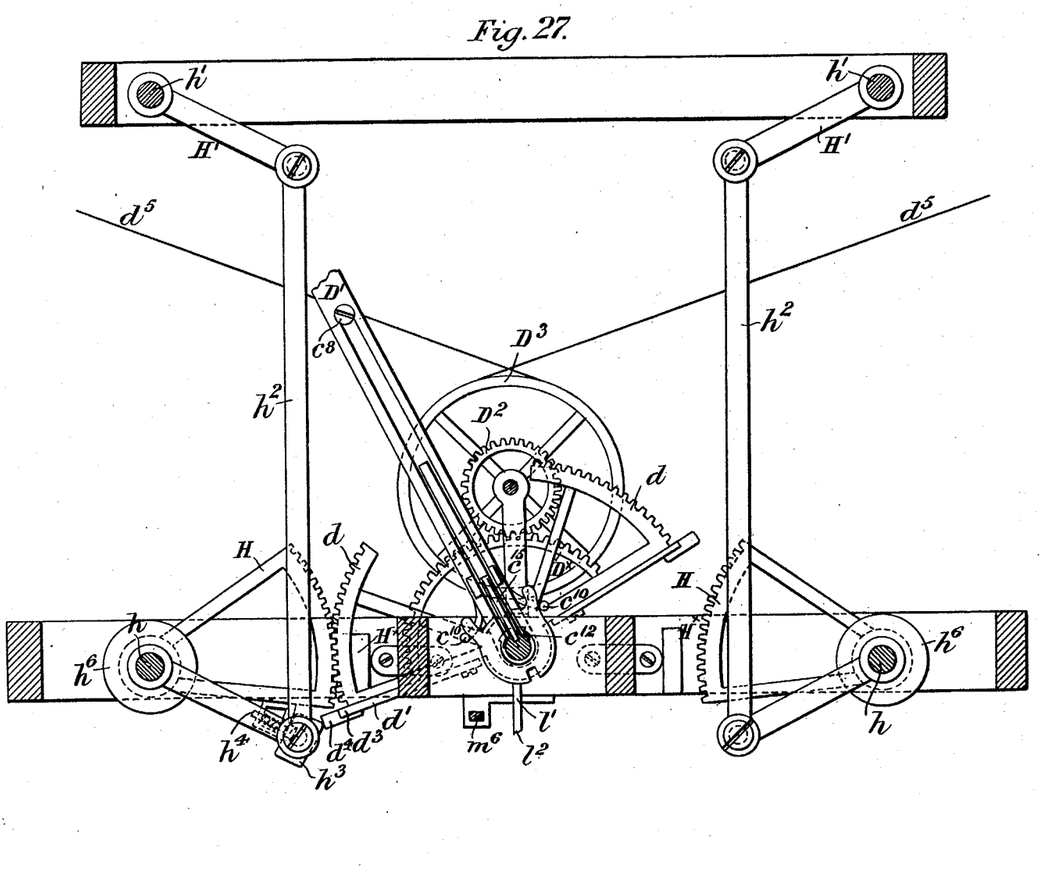
Fig. 27 is a plan view of some of the parts in Fig. 20 in a different position.

As before stated the transport bar D' is always started into movement from one central position in which it is normally held by the action of lever stops $i\ i$ as best seen in Figs. 20 and 23—one stop coming against one side of the bar and the other against the other side—these stops are always lifted just before the toothed quadrants H come into a position in which they can be made to gear with the quadrants D. This is effected by the inclined ends of arms $i'$ on the vertical axes $h'$ then coming against the tail ends $i^2$ of the levers and depressing them. Immediately that the inclines have passed beyond the ends $i^2$ the catches $i$ are pressed back again by the springs $i^4$ into their normal position so as to be ready to again catch and hold the transport bar when it returns to its central position.

The arms $i\ i^2$ are not rigidly connected but are jointed together by what is known as a knuckle joint—the spring $i^3$ normally keeps the two parts in the position shown in Fig. 23—in this way the arms $i'$ on the axes $h'$ will on their return movement not lift the levers $i$ but will turn the arms $i^2$ into the position shown on the right hand side of Fig. 23—and when they have passed below these arms the arms will be turned back to their normal position by the springs $i^3$.

When the transport bar D' has been drawn to one side or the other from its central position and its movement has been arrested by one or other of the stop pins $f$ a type is caused to be ejected from the bottom of the type reservoir. This is done in the following manner:—The pusher carried at the lower end of each type reservoir has two pins $k^6$ descending from it. A pin $c^7$ on the pusher rod $c^2$ comes between the two descending pins of the pusher belonging to the type reservoir K under which the end of the transport bar is brought to rest. The pusher rod $c^2$ is contained within the transport bar D' which is hollow and is pushed back by a coiled spring $c^6$ as shown in Fig. 7. The rear end of the pusher rod bears against one arm of a crank lever $c^{15}$—the other arm has at its end a toothed quadrant which gears with a toothed rack $c^{13}$ which can be slid up and down in a groove in the vertical axis B—on the lower end of the toothed rack are projections $c^{14}$; a disk $l^4$ which loosely surrounds the axis B rests on these projections. The pusher rod is thrust forward at the proper times by forcing downward the disk $l^4$. The disk is thrust downward at the proper times in the following manner: $l'$ is a vertical rod drawn upward by a coiled spring $l$—a lever $a^9$ rests upon the top of the rod and an arm $a^3$ on the revolving shaft A' strikes upon this lever and depresses the rod once for each revolution of the shaft. $l^2$ is a catch piece jointed to the rod $l'$. Normally the catch piece is held in the position shown in Fig. 7 by a spring $l^\times$—when the rod $l'$ is forced downward the catch piece comes down upon the disk $l^4$ and the disk is carried downward with the rod—and the pusher rod is thereby thrust forward to eject a type from one or other of the type reservoirs.

When the transport bar is in its central position and no finger key has been pressed down no forward movement is given to the pusher rod and no type is ejected from the central reservoir opposite to which the end of the transport bar then is. The disk $l^4$ has for this purpose a notch $l^6$ formed in its circumference which when the transport bar is in its central position is immediately below the catch $l^2$ so that when this catch descends the disk is not carried down with it. If however a type is required to be ejected from the central type reservoir and the key which has to be depressed to effect this has been depressed then the catch piece is turned somewhat on its axis and cannot then pass down through the notch in the disk but engages with the disk and carries it down when it descends. In Fig. 7 an arm projecting from the catch piece is shown to be coupled by a rod $l^7$ with the uppermost finger key shown in that figure.

To prevent the catch $l^2$ from passing down through the notch $l^6$ in the disk $l^4$ when the transport bar has only been moved a short distance from its central position to take letters from the type reservoirs nearest to the central reservoir provision is made for giving to the disk a slight turn in addition to that given to it by the turning of the transport bar whenever the movement of the transport bar to one side or the other is arrested by one or other of the stop pins $f$. This is effected by a lever $C^3$ situated just below the transport bar and jointed to it at $c^8$—horns $c^9$ at one end of the lever come on either side of the transport bar and form stops to limit the movement of the lever around its axis. Other horns $c^{10}$ stand up from the other end of the lever and come against projections $l^5$ which stand out from the disk $l^4$. When the transport bar moves to one side or the other toward any stop pin $f$ which may have been raised the lever $C^3$ comes against the pin and its movement is thereby arrested while the transport bar continues its movement until one of the horns $c^9$ on the end of the lever comes against the side of the transport bar and stops it. The lever $C^3$ has therefore a slight turning movement relatively to the transport bar whenever the bar is stopped by one or other of the stop pins. When the transport bar returns to its central position a spring $C^{20}$ turns the lever $C^3$ back to its central position.

In order to avoid any irregularity of motion during the movement of the transport bar and to bring the transport bar quickly to rest when it returns to its central position I fix upon the top of the axis B a toothed arc $p$ and bar $p'$. On opposite sides of the axis B are two other axes carrying toothed arcs $p^2$ and bars $p^4$ which bars are by means of coiled springs contained in spring boxes $p^3$ made to bear in the direction of the arrows in Fig. 22 against opposite ends of the bar $p'$ when the transport bar is in its central position—at the same time further movement of the toothed arcs $p^2$ is prevented by fixed stops $p^\times$ as shown. The bringing back of the transport bar correctly to its central position is thus insured.

Figures 7X, 12, 12A, 13:
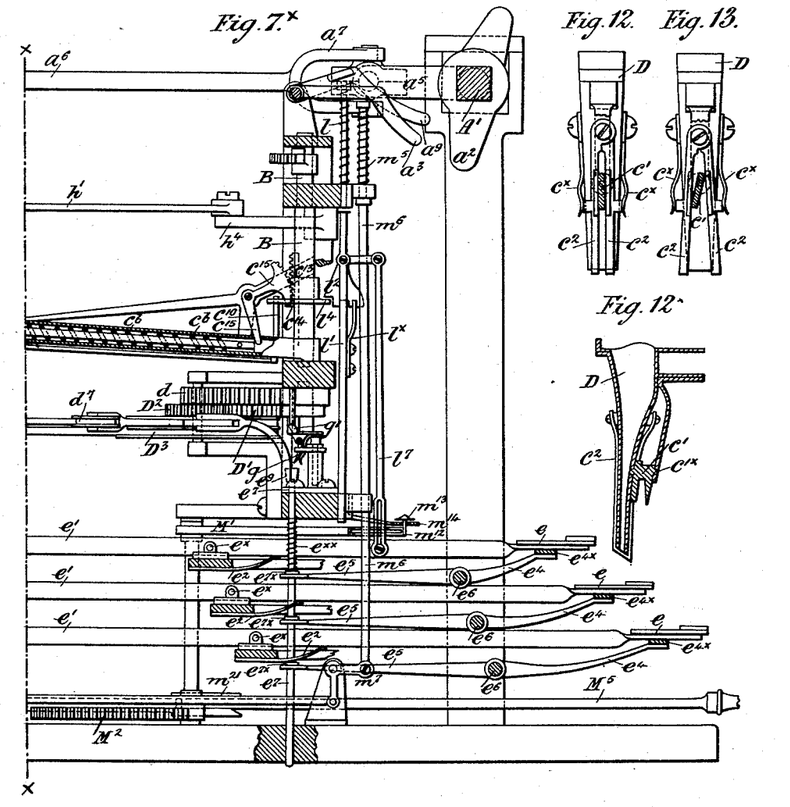
Figs. 12 and 13 show the carrier D with its parts in two different positions. Fig. $12^\times$ is a view in section of the carrier and the devices connected therewith, shown in Figs. 12 and 13.
Figure 8:
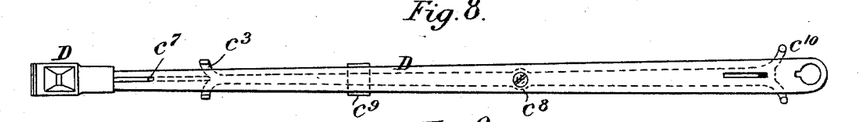
Figs. 8 and 9 are plan and cross section of transport bar.
Figure 9:
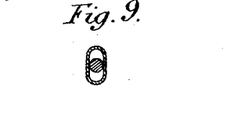
Figures 10, 11:
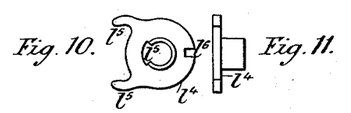
Figs. 10 and 11 a plan and edge view of piece $l^4$.

Whenever the transport bar is moved from its central position and is brought to rest with its extremity below any one or other of the type reservoirs, the pusher of that reservoir is caused to eject as above explained the lowermost type which that reservoir contains—and the type drops into the carrier or receptacle D which is carried at the end of the transport bar—fingers $c^2$ pressed inward by springs $c^\times$ prevent the type from dropping out from the bottom of this receptacle until the transport bar has moved back to its central position the fingers then open and allow the type to drop. The opening of the fingers is effected by a cam piece $c'$ situated between them, this cam piece is carried by a short axis $c'^\times$. When the transport bar returns to its central position an arm which projects down from the short axis comes against a fixed stop $c^3$ and a partial turn is thereby given to the axis and the cam piece is so caused to separate the fingers as shown at Fig. 13—the liberated type then falls through a channel $m$ into the upper end of one of the channels $m'$ in which the type are to be set up in line and are afterward pushed downward along this channel by a reciprocating pusher $m^9$ a loose block $m^4$ (see Fig. 7) in the channel keeps the type from falling—the pusher $m^9$ is pushed backward by a spring $m^\times$ and is made to move forward once at each revolution of the shaft A' by the rocking of crank levers $m^7$ the last of which is rocked by the depression of a rod $m^6$. A lever $a^3$ rests upon the top of the rod and the rod is depressed whenever the cam $a^2$ on the shaft A' comes against this lever. When the cam $a^2$ has passed the lever $a^3$ the rod is raised to its former position by the action of a coiled spring $m^5$ which surrounds its upper end.

To indicate the length of the row of type as it is being set up in the channel $m'$ the end of a slide $m^3$ (see Fig. 14) is made to bear against the back of the block $m^4$—the slide has upon it a toothed rack which gears with a pinion $m^{10}$—this pinion gears with another toothed rack on a rod $m^{11}$—a second rack on this rod gears with a toothed quadrant $M^2$ and so gives movement to a quadrant $M^4$ which is connected as shown by a cord $m^{12}$ with another quadrant $M^3$.

Figure 3:
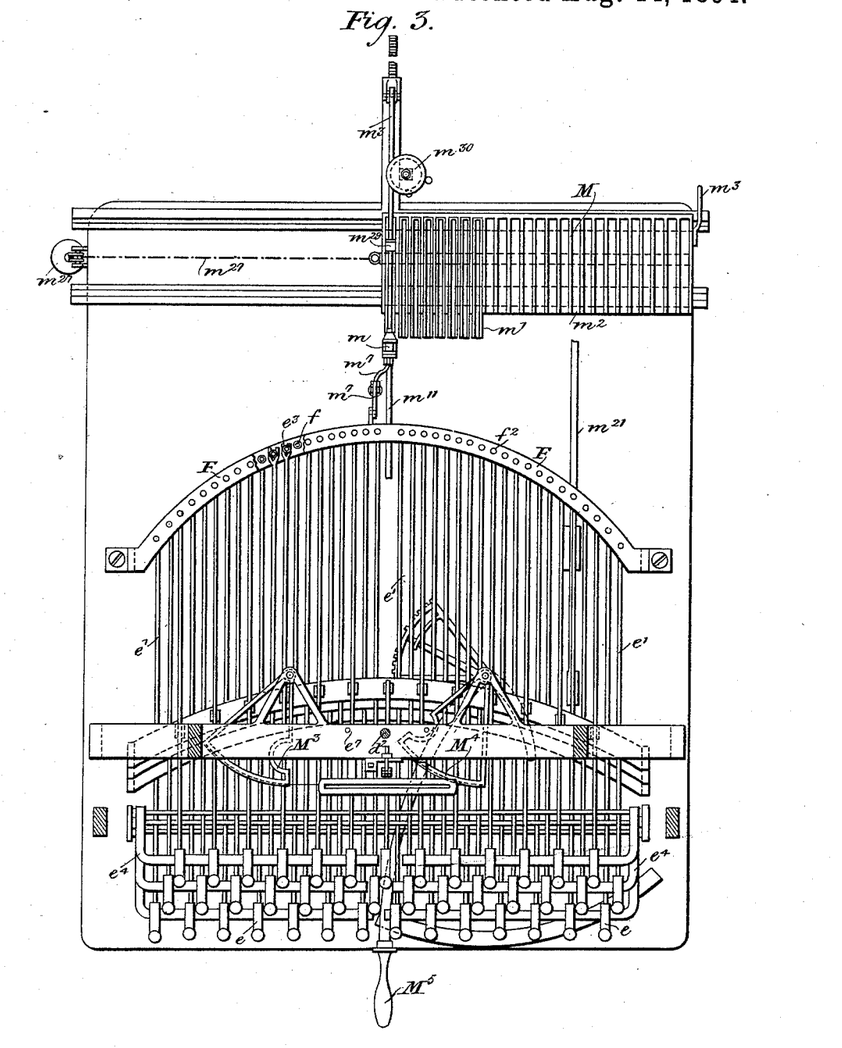
Fig. 3 a horizontal section on the line $x$, $x$, Fig. 1.

The cord is coupled to an index $m^{13}$ which slides along the slit of a scale $m^{14}$. When the index $m^{13}$ comes up to a band $m^{15}$ which can be secured to the scale at any desired point of its length, it indicates to the operator that the line has been made of the required length. The operator then causes the type channel $m'$ which contains the line to be moved forward and the next type channel $m'$ to be brought into place to have the next line set up within it. The type channels $m'$ are for this purpose carried in a holder M (see Figs. 3 and 14) which is drawn forward by the action of a weighted cord $m^{27}$ (see Fig. 3). An anchor escapement lever $m^{25}$ (see Fig. 17) engaging with a rack of ratchet teeth on the under side of the holder M keeps this holder from being drawn forward but when the escapement lever is rocked it moves forward a distance of one tooth. The operator gives to it this rocking movement at the proper time in the following manner:—M⁵ (see Figs. 7 and 14) is a lever which turns loosely on the axis of the toothed quadrant M². An arm $m^{16}$ which projects from the lever is held by a spring catch $m^{17}$ up to a stop $m^{17×}$ on the quadrant so that when the quadrant turns during the setting up of a line of type the lever M⁵ turns with it.

Figures 14, 15, 16, 17, 18, 19:
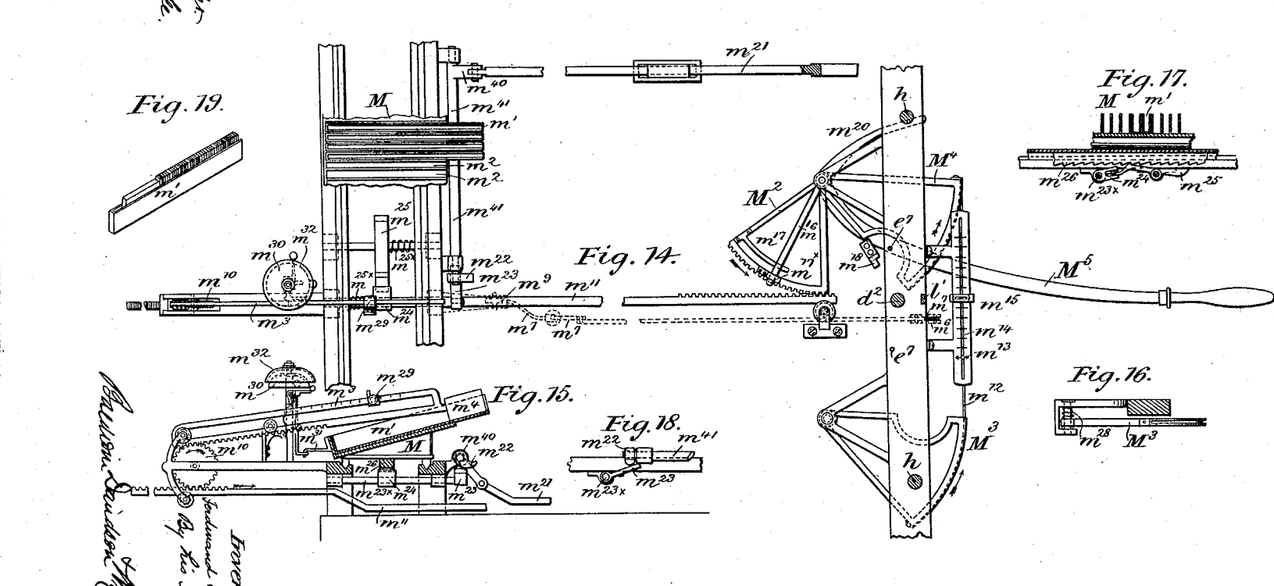
Fig. 14 a plan view of mechanism for moving the galley which carries the holders $m'$ in which the type are to be set up in line.
Fig. 15 is a vertical section of the same.
Figs. 16, 17 and 18 show details of some of the parts of the same.
Fig. 19 is a perspective view of a filled line holder.

When a line is finished the lever comes into the position shown in dotted lines in Fig. 4—the operator then moves the lever still farther to the right—the spring catch $m^{17}$ then strikes against the stop $m^{18}$ and is liberated while the movement of the lever is continued until an arm $m^{20}$ fast with it comes against a rod $m^{21}$ (see Fig. 14) and moves it endwise. The rod at its farther end is jointed to an arm $m^{40}$ on an axis $m^{41}$ (see Figs. 14 and 15). On this axis is a cam $m^{22}$ which bears upon an arm $m^{23}$ (see Fig. 18) on an axis $m^{23×}$. On this axis is an arm $m^{24}$ (see Fig. 17) which is forked so as to embrace a projection from the escapement lever $m^{25}$ as shown. When therefore the lever $m^5$ strikes against and pushes back the rod $m^{21}$ the escapement lever $m^{25}$ is rocked and the holder M is allowed to move forward a distance of half a tooth of the rack $m^{26}$—when the lever $m^5$ is moved back again the escapement lever is rocked in the opposite direction and the holder M moves forward another half tooth—the escapement lever $m^{25}$ and axis $m^{23}$ are rocked in this direction by coiled springs $m^{25×}$ as shown in Figs. 4 and 14. Also as the lever is moved back to its first position it again becomes locked to the quadrant M² and turning this quadrant causes the slide $m^3$ to come forward and bear against the block $m^4$ contained in the new type channel $m'$ which has by the above movements been brought into position for having a line of type set up within it. The quadrant M³ is turned back by a coiled spring $m^{28}$ as shown in Fig. 16.

As words have frequently to be divided warning has to be given to the operator as a line approaches completion—to do this the slide $m^3$ carries a tappet $m^{29}$ (see Fig. 15) which when a line is nearly completed releases the hammer of a bell $m^{32}$ and allows it to strike the bell.

When the last of the channels $m'$ in the holder M comes into position to be filled a projection $m^{31}$ fixed on the holder causes a second bell $m^{32}$ to be struck and draws the operator's attention to the necessity of changing the holder for another one containing empty type channels.

What I claim is—

1. The combination of a series of type reservoirs from one end of each of which type can be taken one by one such reservoirs having these ends ranged in the arc of a circle, a carrier supported just below the level of these ends by an arm which can be turned to and fro around a vertical axis concentric with the arc, a take secured to the arm near its extremity and led in opposite directions around two guide pulleys at the two sides of the machine, a series of finger keys, a continuously revolving shaft and mechanism driven from this shaft put into gear by the depression of any finger key for first pulling upon one cord to draw the arm to one side and afterward upon the other cord to draw the arm back again until its end is opposite to the center of the arc.

2. The combination of a series of approximately vertical type reservoirs ranged side by side in the arc of a circle each suitable for containing type lying singly one above the other radially to the point from which the arc is struck a carrier just below the level of the bottom of the reservoirs mounted on an arm capable of being turned to and fro around a vertical axis concentric with the arc, a series of finger keys, a continuously revolving shaft, mechanism driven by this shaft put into gear for moving the arm to the right or left whenever a finger key is depressed and for subsequently bringing the arm back to its central position, a series of pins one for each finger key which are raised when the finger keys are depressed and serve as stops to limit the movement of the arm to one side or the other, a pusher extending lengthwise along the arm, a cam on the continuously revolving shaft for thrusting the pusher forward when the arm has been arrested by one of the stop pins and for then causing it to thrust the bottom type from one of the type reservoirs and allow it to drop into the carrier, mechanism for opening the carrier after the arm has returned to its central position, a channel to receive the type that then drops from the carrier and a pusher worked to and fro by a cam on the continuously revolving shaft for then pushing the type a short distance along this channel.

3. The combination of a series of approximately vertical type reservoirs ranged side by side in the arc of a circle each suitable for containing type lying one above the other radially to the point from which the arc is struck, a carrier just below the level of the bottom of these reservoirs mounted on an arm capable of being turned to and fro around a vertical axis concentric with the arc, a tape secured to the arm near its extremity and led in opposite directions around two guide pulleys at the two sides of the machine—a series of finger keys, a continuously revolving shaft, mechanism driven by this shaft put into gear by the depression of any finger key for first pulling upon one cord to draw the arm to one side and afterward upon the other cord to draw the arm back again until its end is opposite to the center of the arc, a series of pins one for each finger key which are raised when the finger keys are depressed and which serve as stops to limit the movement of the arm to the one side or the other, a pusher extending lengthwise of the arm, a cam on the continuously revolving shaft for thrusting the pusher forward when the arm has been arrested by one of the stop pins and for then causing it to thrust the bottom type from one of the type reservoirs and allow it to drop into the carrier, mechanism for opening the carrier after the arm has returned to its central position, a channel to receive the type that then drops from the carrier and a pusher worked to and fro by a cam on the continuously revolving shaft for then pushing the type a short distance along this channel.

FERDINAND PRAUNEGGER.

Witnesses:
ANTON WETTENDORFER,
RUDOLF WERDOWITZ.